(12) United States Patent
Tan

(10) Patent No.: US 9,396,892 B2
(45) Date of Patent: Jul. 19, 2016

(54) KEYBOARD STRUCTURE FOR IMPROVED ILLUMINATION CHARACTERISTICS

(75) Inventor: Min-Liang Tan, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 14/382,253

(22) PCT Filed: Feb. 29, 2012

(86) PCT No.: PCT/SG2012/000057
§ 371 (c)(1),
(2), (4) Date: Oct. 7, 2014

(87) PCT Pub. No.: WO2013/130009
PCT Pub. Date: Sep. 6, 2013

(65) Prior Publication Data
US 2015/0103508 A1 Apr. 16, 2015

(51) Int. Cl.
*G01D 11/28* (2006.01)
*H01H 13/83* (2006.01)
*G06F 3/02* (2006.01)
*F21V 7/00* (2006.01)

(52) U.S. Cl.
CPC .................. *H01H 13/83* (2013.01); *F21V 7/00* (2013.01); *G06F 3/0219* (2013.01)

(58) Field of Classification Search
CPC ...... H01H 13/83; G06F 3/0202; G06F 3/0219
USPC ....................... 362/23.03–23.05, 23.07–23.1; 200/313–314
See application file for complete search history.

(56) References Cited

U.S. PATENT DOCUMENTS

| 7,193,535 | B2 * | 3/2007 | Shipman | ............... G06F 3/0202 341/31 |
| 8,168,903 | B2 * | 5/2012 | Chen | ............................. 200/310 |

(Continued)

FOREIGN PATENT DOCUMENTS

| KR | 10-2007-0006188 A | 1/2007 |
| TW | M323075 U | 12/2007 |

(Continued)

OTHER PUBLICATIONS

"International Search Report dated Nov. 1, 2012," International Application No. PCT/SG2012/000057, 3 pages.

(Continued)

*Primary Examiner* — Jason Moon Han
(74) *Attorney, Agent, or Firm* — Polsinelli PC

(57) ABSTRACT

A keyboard structure for improving the uniformity of illumination comprises a substrate having a reflective surface and a key switch assembly. The key switch assembly is disposed adjacent and specifically on top of the substrate and comprises a keycap, a contact assembly and a light emitting means. The light emitting means can be located either between the keycap and the contact assembly or on the substrate and adjacent to the contact assembly. The keycap further has a portion which is optically transmissive. The light from the light emitting means, directly and/or after reflecting from the reflective surface passes through one or more of the gap between adjacent keycaps or a row of keycaps and through the optically transmissive portion of the keycaps, thus illuminating the keyboard structure. Different colors may be used in different zones of the keyboard. The reflective surface and the light emitting means can have the same color.

15 Claims, 4 Drawing Sheets

(56) References Cited

U.S. PATENT DOCUMENTS

| | | | |
|---|---|---|---|
| 8,247,722 B2* | 8/2012 | Ominato | 200/314 |
| 2005/0068202 A1 | 3/2005 | Shipman | |
| 2005/0150753 A1 | 7/2005 | Hsu | |
| 2007/0025097 A1 | 2/2007 | Cheng | |
| 2010/0018845 A1* | 1/2010 | Lin | 200/314 |
| 2010/0026528 A1 | 2/2010 | Chou | |
| 2010/0039297 A1 | 2/2010 | Chou | |
| 2010/0148996 A1 | 6/2010 | Wang | |
| 2010/0181176 A1 | 7/2010 | Igarashi | |
| 2010/0282581 A1 | 11/2010 | Lin | |
| 2011/0147180 A1 | 6/2011 | Chen | |
| 2011/0298716 A1 | 12/2011 | Mahowald et al. | |

FOREIGN PATENT DOCUMENTS

| | | |
|---|---|---|
| TW | M332227 U | 5/2008 |
| WO | 2011021771 A2 | 2/2011 |

OTHER PUBLICATIONS

"Written Opinion dated Oct. 30, 2012," International Application No. PCT/SG2012/000057, 3 pages.

"International Preliminary Report on Patentability dated Sep. 2, 2014," International Application No. PCT/SG2012/000057, 4 pages.

First Office Action Issued Nov. 4, 2015 in Taiwanese Patent Application No. 102107039.

Extended European Search Report issued Sep. 23, 2015 in European Patent Application No. 12869937.8, 6 pages.

First Office Action issued Aug. 18, 2015 in Chinese Patent Application No. 201280070951.5, 11 pages.

Second Office Action mailed Apr. 8, 2016 for CN Patent Application No. 201280070951.5.

* cited by examiner

KEYBOARD STRUCTURE FOR IMPROVED ILLUMINATION CHARACTERISTICS

TECHNICAL FIELD

The present invention relates to keyboard structures for improved uniformity in the reflection of light. This invention has particular, but not exclusive, application in the gaming industry.

BACKGROUND

Keyboards find use not only as input devices for computing applications, but are also widely used in the gaming industry for controlling purposes. For instance, a gamer may use the key board alone for controlling or a combination of the keyboard and any other device such as a mouse or a joystick. The environment in professional gaming parlours and gaming centres nowadays have less light or very minimal light, the reason for which is to bring out the gaming experience to the fullest. Under conditions of less light, the keys in the keyboards that are used in the gaming centres may not be visible to the gamer. The gamer may press the wrong key which may be undesirable or take time in finding out the key, which wastes a lot of precious time when playing games.

Keyboards with backlighting have been developed to ameliorate the problems stated above. In US 2010/0039297, grooves are arranged between the rows of keys on the keyboard. The grooves are illuminated by lighting devices on either end of the grooves. The grooves are located near the base of the keys. The grooves have two sidewalls running along the length of the same. One of the sidewalls has a reflective surface. So when light is transmitted along the groove, the reflective sidewall reflects the light upwards and between the rows of the keys, so as to illuminate the keyboard.

Moreover, in US 2010/0148996, the keys in the keyboard are associated with reflective structures such that light from the lighting element associated with the keyboard is reflected by the reflective structures so as to light the internal cavity of the key and illuminate them.

However, there is no complete illumination of the keyboard provided by the above described references and also there is no uniform illumination.

SUMMARY

In an aspect of the invention, there is disclosed a keyboard structure for improved illumination characteristics of the keyboard structure. The keyboard structure comprises a substrate having a reflective surface and a key switch assembly disposed adjacent the substrate. The key switch assembly comprises a keycap, a contact assembly and a light emitting means, wherein light emitted from the light emitting means is incident on the reflective surface of the substrate and is reflected to areas surrounding the key switch assembly.

DETAILED DESCRIPTION

Figure 1:
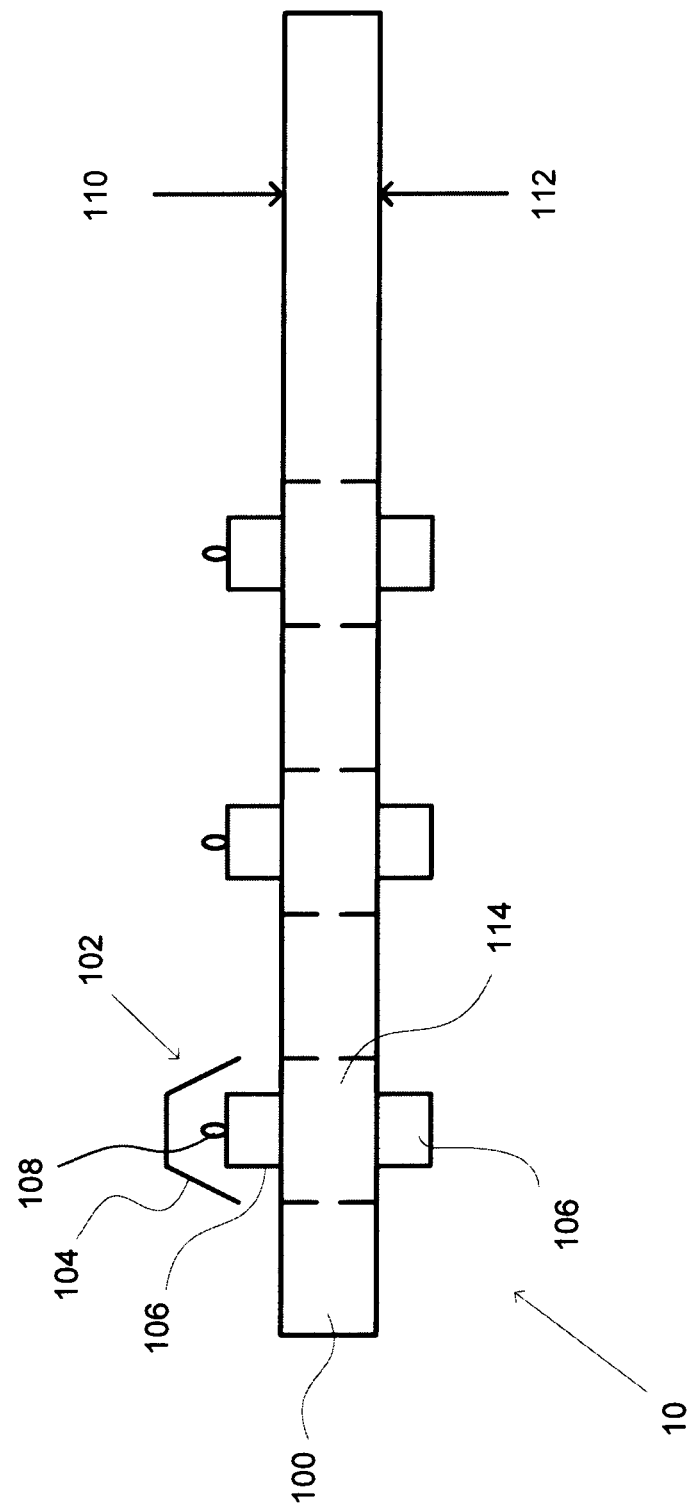
FIG. 1 shows a side view of an exemplary embodiment of a keyboard structure 10

Representative embodiments of the disclosure for addressing one or more of the foregoing problems associated with illuminating and/or transmitting light on keyboards and key switch mechanisms are described hereafter with reference to FIGS. 1 to 4. For purposes of brevity and clarity, the description herein is directed to a structure for improving illumination characteristics on keyboard structures, such as uniformity of illumination. This, however, does not preclude various embodiments of the disclosure from other applications where fundamental principles prevalent among the various embodiments of the disclosure such as operational, functional, or performance characteristics are required. In the description that follows, like or analogous reference numerals indicate like or analogous elements.

Accordingly, the present disclosure has been made keeping in mind the above problems occurring in the prior art, and an object of the present invention is to provide a structure for improving uniformity in illumination.

The structure for improving uniformity in illumination comprises a substrate and a key switch assembly. In many embodiments, the key switch assembly comprises a keycap, a contact assembly and light emitting means. The light emitting means is disposed adjacent the contact assembly, which will be described further below in conjunction with the drawings. In some embodiments, space optimization is achieved by disposing the light emitting means between the keycap and the contact assembly. The substrate by having a reflective surface, the substrate reflects light that is incident on the reflective surface to areas surrounding the key switch assembly.

FIG. 1 shows a side view of an exemplary embodiment of a keyboard structure 10. The keyboard structure 10 is for improving uniformity in illumination. Keyboards, key switch mechanisms and other computer peripherals are essentials for gaming applications and for most of the time, these games are played with minimal or no environmental lighting. Therefore, it is essential for keyboards, key switch mechanisms and other computer peripherals to be illuminated. The keyboard structure 10 is suitable for implementing in keyboards and/or key switch mechanisms. In other words, the keyboard structure 10 can be integrated into keyboards and/or key switch mechanisms.

The keyboard structure 10 comprises a substrate 100 and a key switch assembly 102. The key switch assembly 102 is disposed adjacent the substrate 100 and in many embodiments, the substrate 100 has a reflective surface. This will be further elaborated later. The key switch assembly 102 comprises a keycap 104, a contact assembly 106 and a light emitting means 108. In many embodiments, the contact assembly 106 is disposed between the keycap 104 and the substrate 100.

The substrate 100 comprises a top surface 110 and a bottom surface 112 opposite the top surface 110. Both the top surface 110 and the bottom surface 112 of the substrate 100 are substantially planar. In some embodiments, the substrate 100 comprises a raised border. The substrate 100 is made from plastic, metal or a combination thereof. In some embodiments, the substrate 100 is a printed circuit board. To facilitate the improvement in uniform illumination from the light emitting means 108, the substrate 100 has a reflective surface formed by a reflective paint layer. In some embodiments, the reflective paint layer is formed at the top surface 110 and in some other embodiments, a separate reflective plate is formed and disposed on the top surface 110. Formation of the reflective paint layer is achieved by immersing or coating the substrate 100 with reflective paint. This ensures that the reflective paint is homogenously applied on the substrate 100 to facilitate uniformity in reflection and subsequent uniformity in illumination of the keyboard structure. The reflective paint is of at least one of blue, green, red, orange and yellow colour.

Figure 2:
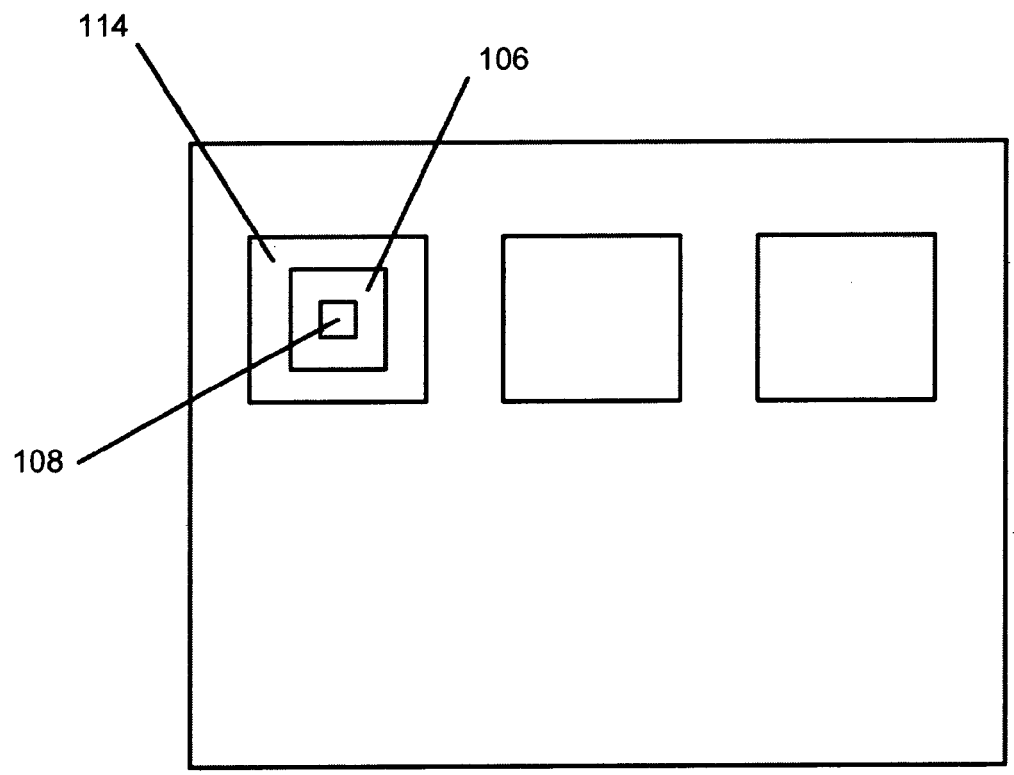
FIG. 2 shows a partial plan view of the keyboard structure 10 (without the keycap 104) in accordance with the embodiment shown in FIG. 1

FIG. 2 shows a partial plan view of the keyboard structure 10 (without the keycap 104) in accordance with the embodiment shown in FIG. 1. The substrate 100 comprises perforations 114 and each of the perforations 114 is shaped and dimensioned to accommodate the key switch assembly 102 therethrough. In other words, the perforations 114 are shaped and dimensioned such that the contact assembly 106 can protrude from each perforation 114 therethrough. The dimensions of the perforations match those of the keycap 104.

The keycap 104 serves to represent specific keys of a keyboard or key switch mechanism. Icons, numbers, alphabets, figures, and/or symbols can be inscribed on the keycap 104 to distinctly identify a specific key of a keyboard or key switch mechanism. In many embodiments, at least a portion of the keycap 104 is optically transmissive. While it is usual for the inscribed portions on the keycap 104 to be optically transmissive, the optically transmissive portions of the keycap 104 are not restricted to those inscribed portions. When the light emitting means 108 is in operation, the optically transmissive portions of the keycap 104 facilitates light from the light emitting means 108 and the light reflected from the reflective surface of the substrate 100 to be transmitted through the optically transmissive portions of the keycap 104 and hence improving visibility of the keycap 104. This will be explained in details later.

The contact assembly 106 is a type of mechanical switch suitable for use with keyboards and key switch mechanisms. One example of a mechanical switch is one manufactured by Cherry Corporation (Auerbach, Germany). As will be appreciated by an ordinary person in the art, each contact assembly 106 is coupled to at least one keycap 104. The contact assembly 106 is configured to provide a tactile user feedback upon user actuation of the key and is one of physically and electrically coupled to a circuit module (not shown).

The light emitting means 108 includes a light emitting diode and the light emitting means 108 is electrically coupled to the contact assembly 106, such that when the key cap 104 is pressed, power is supplied to the light emitting means 108. In some other embodiments, the light emitting means 108 is electrically coupled to other power sources such as a circuit module (not shown) so as to provide energy to operate the light emitting means 108. In this case, power is supplied always to the light emitting means 108 so that there is always light being emitted from the light emitting means 108, regardless of whether the keycap 104 is pressed or not. The light emitting means 108 includes but is not limited to at least one of blue, green, red, orange and yellow colour. In some embodiments, the light emitting means 108 is of a single homogeneous colour while in other embodiments, the light emitting means 108 can be multi-coloured. For instance, portions of the light emitting means 108 can be blue while other portions of the same said light emitting means 108 is in red or green colour.

Figure 3:
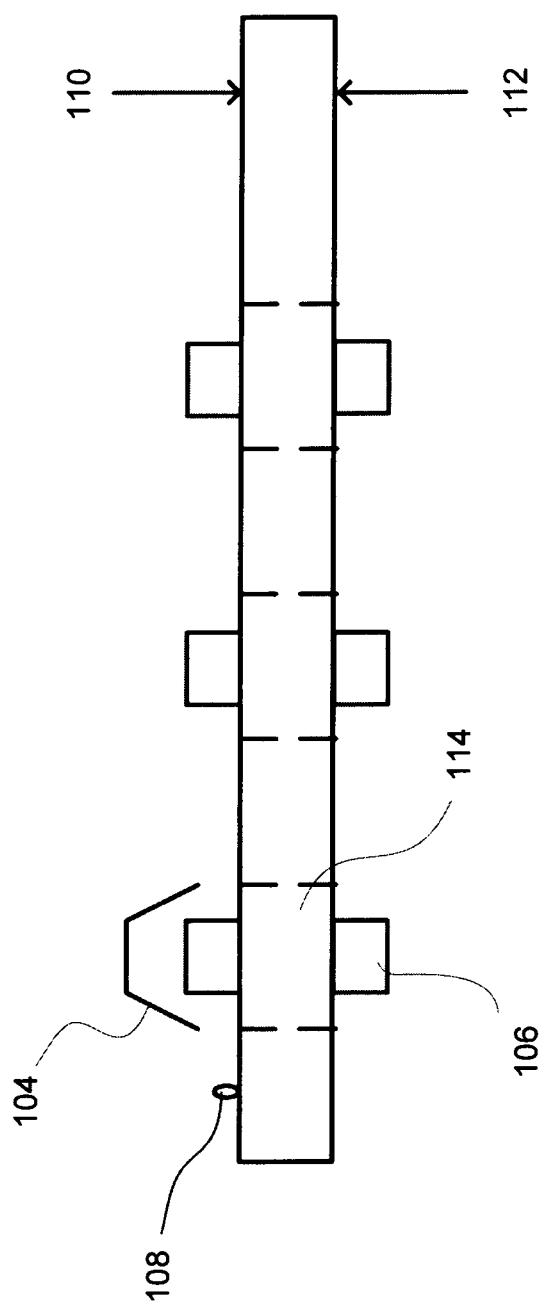
FIG. 3 shows another exemplary embodiment of the keyboard structure 10

FIG. 3 shows another exemplary embodiment of the keyboard structure 10. As shown in FIGS. 1 and 3, the light emitting means 108 can be configured in a plurality of ways. In both embodiments, the light emitting means is disposed adjacent the contact assembly 106, which will be further described below. In FIG. 1, the light emitting means 108 is disposed between the keycap 104 and the substrate 100. In FIG. 3, the light emitting means 108 is disposed on the substrate 100 and is thereby adjacent to both the substrate 100 and the contact assembly 106. Although this disclosure describes two configurations of disposing the light emitting means 108 as shown in FIGS. 1 and 3, it should be appreciated by a person of ordinary skill in the art that other configurations can be implemented. In other words, the scope of the embodiments in this disclosure regarding the disposal of the light emitting means 108 should not be limited by these two configurations. Depending upon embodiment details, the keyboard structure 10 can comprise one or more configurations in relation to the disposal of the light emitting means 108. For instance, in a keyboard structure 10, a portion of the light emitting means 108 can be positioned adjacent the contact assembly 106 (FIG. 1) and the remaining of the light emitting means 108 is positioned adjacent the substrate 100 (FIG. 3).

By disposing the light emitting means 108 adjacent the contact assembly 106 and/or adjacent the substrate 100, light emitted from the light emitting means 108 is incident on the reflective surface of the substrate 100 and is reflected to areas surrounding the key switch assembly 102. The areas surrounding the key switch assembly refers to the periphery of each key cap 104, the gaps between adjacent keycaps or a row of keycaps, and also above the keycap 104. The light emitted from the light emitting means 108 and the light reflected from the reflective surface of the substrate 100 is incident on the internal surface of the keycap and is transmitted through the optically transmissive portion of the keycap 104. The internal surface of the keycap can have the colour of the LED or white in colour to facilitate reflection of incident light onto the reflective surface of the substrate 100. To a user, the light from the light emitting means 108 is visible as light reflected off the surface of the substrate 100 which is transmitted through the gaps between rows of keycaps in the keyboard structure and/or through the optically transmissive portions of the keycap 104. The reflection of light off the reflective surface of the substrate 100 improves uniformity in illumination of the keyboard structure 100. This also provides uniform lighting to the peripheral portions of the keycap 104 and the gaps between the keycaps or between rows of keycaps. In other words, the uniformity in illumination of the keyboard structure 10 is by way of light reflected off the surface of the substrate 100. As such, the keyboard structure 10 can be an integral part of an illuminated keyboard and/or key switch mechanism to provide uniform light illumination.

To improve intensity of illumination and light efficiency, the substrate 100 and the light emitting means 108 can have identical colour characteristics. For instance, the keyboard structure 10 can comprise a substrate 10 having a reflective surface formed by green reflective paint and the light emitting means 108 being green in colour.

Figure 4:
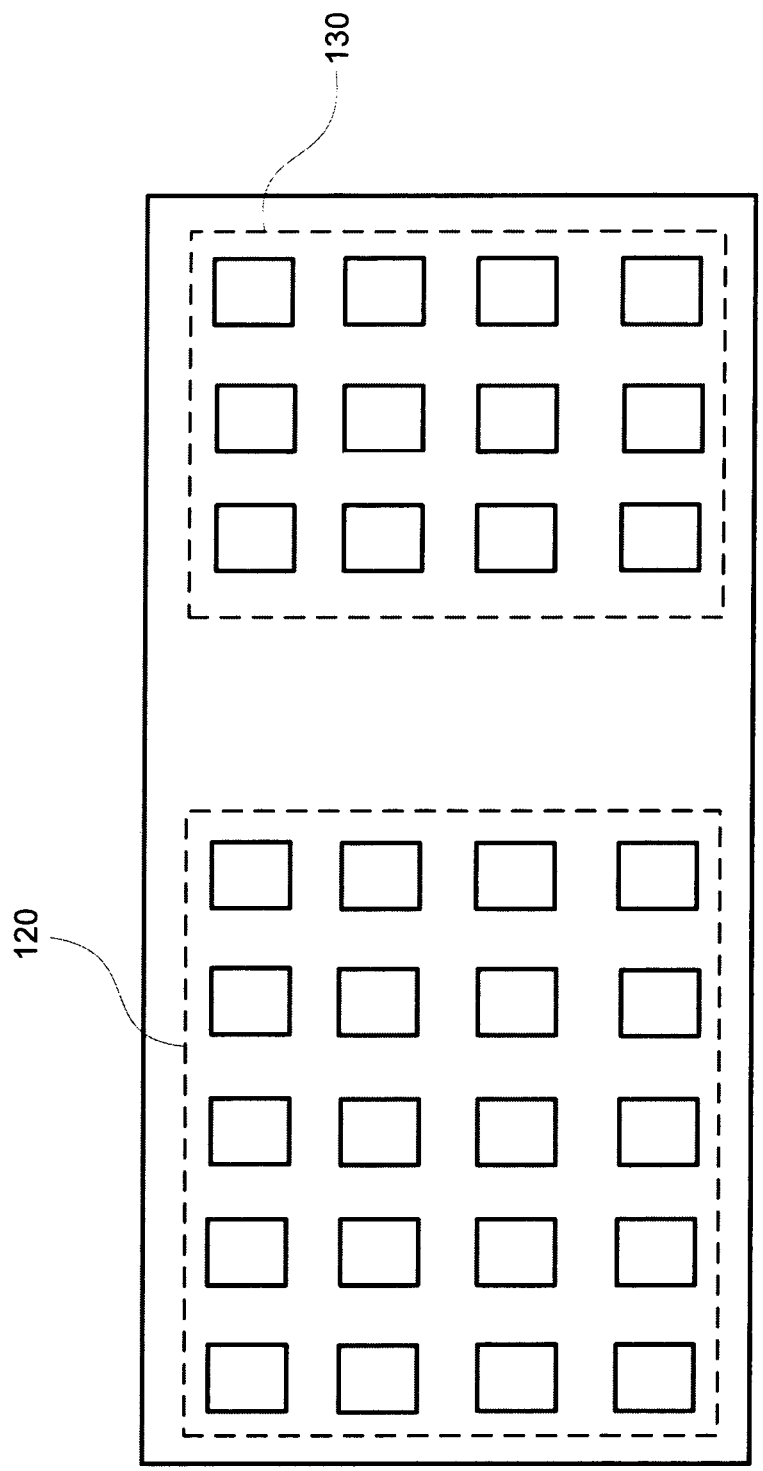
FIG. 4 shows different zones in the key board structure with different colour characteristics

FIG. 4 shows different zones in the key board structure with different colour characteristics. The keyboard structure 10 can be multi-coloured by having reflective paints with different colours on different zones on the surface of the substrate 100. For instance, as illustrated in FIG. 4, the substrate 100 can have a first zone 120 having a green reflective surface and light emitting means 108 emitting green light. Further, the substrate 100 can have a second zone 130 having a red reflective surface and light emitting means emitting red light. In this way, a single keyboard or a key switch mechanism can have more than one colour, which helps with easy identification of control zones. To elaborate, applying the above to a normal QWERTY keyboard, the reflective surface can be red under the NUM pad and the reflective surface can be green under the alphabet pad. Any different colour combination can be used as well and is not limited to the above. Having more than one colour of reflective paint on the surface of the substrate 100 enhances the aesthetic appearance of the keyboard structure 10 by creating multi colour effects. For some specific gaming applications, having a multi-coloured keyboard structure 10 enhances the gaming experience of the user and/or allows the user to clearly and/or easily identify certain keys within a designated colour 'zone'.

The keyboard structure 10 disclosed herein in this disclosure allows and facilitates improvement in the uniform illumination of the keyboard structure. When the colour of the reflective paint on the surface of the substrate 100 is identical to the light emitting means 108, the intensity of light transmitted and/or dispersed from the keys is reinforced.

It is to be understood, however, that even though numerous characteristics and advantages of the embodiments of the present disclosure have been set forth in the foregoing description, together with details of the structure and function of the embodiments, the disclosure is illustrative only, and changes/modifications may be made in detail, especially in matters of size, shape, colour and arrangement of parts within the principles of the embodiments of this disclosure to the full extent indicated by the broad general meaning of the terms in which the appended claims are expressed.

What is claimed is:

1. A keyboard structure for improved illumination characteristics, the structure comprising:
    a substrate having a reflective surface; and
    a key switch assembly disposed adjacent the substrate, the key switch assembly comprising:
        a keycap;
        a contact assembly; and
        a light emitting means, the light emitting means disposed adjacent the contact assembly,
    wherein light emitted from the light emitting means is incident on the reflective surface of the substrate and is reflected to areas surrounding the key switch assembly including gaps between adjacent keycaps;
    wherein the substrate comprises perforations shaped and dimensioned to accommodate the key switch assembly therethrough; and
    wherein the keycap comprises an internal surface, and wherein incident light is reflected by the internal surface onto the reflective surface of the substrate and is further reflected by the reflective surface to the areas surrounding the key switch assembly.

2. The structure of claim 1, wherein the reflective surface being formed by a reflective paint layer.

3. The structure of claim 2, wherein the reflective paint layer being in at least one of blue, green, red, orange and yellow colour.

4. The structure of claim 1, wherein at least a portion of the keycap is optically transmissive.

5. The structure of claim 1, wherein the substrate comprises a top surface and a bottom surface, the bottom surface opposite the top surface, wherein the top surface and the bottom surface are substantially planar.

6. The structure of claim 5, wherein the contact assembly is disposed between the keycap and the substrate.

7. The structure of claim 1, wherein the light emitting means is disposed between the keycap and the substrate.

8. The structure of claim 1, wherein the light emitting means is electrically coupled to the contact assembly.

9. The structure of claim 1, wherein the light emitting means includes a light emitting diode.

10. The structure of claim 1, wherein the light emitting means is characterized by at least one of blue, green, red, orange and yellow colour.

11. The structure of claim 1, wherein the substrate and the light emitting means have identical colour characteristic.

12. The structure of claim 1, comprising a first zone and a second zone, wherein the first zone and the second zone have different colour characteristics.

13. The structure of claim 1, wherein the internal surface of the keycap is substantially the same colour as the light emitted from the light emitting means, thereby promoting the reflection of the incident light by the internal surface of the keycap onto the reflective surface of the substrate.

14. The structure of claim 1, wherein the internal surface of the keycap is white in colour, thereby promoting the reflection of the incident light by the internal surface of the keycap onto the reflective surface of the substrate.

15. A keyboard structure for improved illumination characteristics, the structure comprising:
    a substrate having a reflective surface; and
    a key switch assembly disposed adjacent the substrate, the key switch assembly comprising:
        a keycap;
        a contact assembly; and
        a light emitting means, the light emitting means disposed adjacent the contact assembly,
    wherein light emitted from the light emitting means is incident on the reflective surface of the substrate and is reflected to areas surrounding the key switch assembly including gaps between adjacent keycaps;
    wherein the substrate comprises perforations shaped and dimensioned to accommodate the key switch assembly therethrough; and
    wherein the keycap comprises an internal surface configured to reflect incident light onto the reflective surface of the substrate for further reflecting to areas surrounding the key switch assembly.

* * * * *